US009585368B2

(12) United States Patent
Gick

(10) Patent No.: US 9,585,368 B2
(45) Date of Patent: Mar. 7, 2017

(54) CHEW TOY

(71) Applicant: Pet Qwerks, Inc., Irvine, CA (US)

(72) Inventor: James W. Gick, Irvine, CA (US)

(73) Assignee: Pet Qwerks, Inc., Irvine, CA (US)

( * ) Notice: Subject to any disclaimer, the term of this patent is extended or adjusted under 35 U.S.C. 154(b) by 47 days.

(21) Appl. No.: 14/642,392

(22) Filed: Mar. 9, 2015

(65) Prior Publication Data

US 2015/0257366 A1 Sep. 17, 2015

Related U.S. Application Data

(60) Provisional application No. 61/951,296, filed on Mar. 11, 2014.

(51) Int. Cl.
*A01K 15/02* (2006.01)
*A01K 11/00* (2006.01)

(52) U.S. Cl.
CPC .................. *A01K 15/026* (2013.01)

(58) Field of Classification Search
CPC ........................... A01K 15/026; A01K 15/025
USPC ........ 119/709, 710, 711, 707; D14/140, 142, D14/147, 148; 379/433.01
See application file for complete search history.

(56) References Cited

U.S. PATENT DOCUMENTS

| 5,750,196 | A   | * | 5/1998  | Welch    | A01K 15/026 119/710 |
| 6,202,598 | B1  | * | 3/2001  | Willinger | A01K 15/026 119/709 |
| 2008/0029045 | A1 | * | 2/2008  | Willinger | A01K 15/026 119/710 |
| 2008/0314333 | A1 | * | 12/2008 | Hurwitz  | A01K 15/026 119/709 |
| 2010/0083910 | A1 | * | 4/2010  | Axelrod  | B29C 66/712 119/709 |
| 2012/0240866 | A1 | * | 9/2012  | Taylor   | A01K 15/026 119/710 |
| 2013/0000564 | A1 | * | 1/2013  | Beckhart | A01K 15/025 119/710 |
| 2013/0273125 | A1 | * | 10/2013 | Barnvos  | A01K 29/00 424/401 |

* cited by examiner

*Primary Examiner* — Monica Williams
(74) *Attorney, Agent, or Firm* — Roland J. Tong

(57) ABSTRACT

A chewable pet toy includes recesses in one or more surface of the chewable toy to permit addition of flavors and treats to a chew toy. The recesses are shaped and oriented to keep the added flavors and treats from contacting floors, rugs and furniture on which the toy may be dropped by the pet.

12 Claims, 2 Drawing Sheets

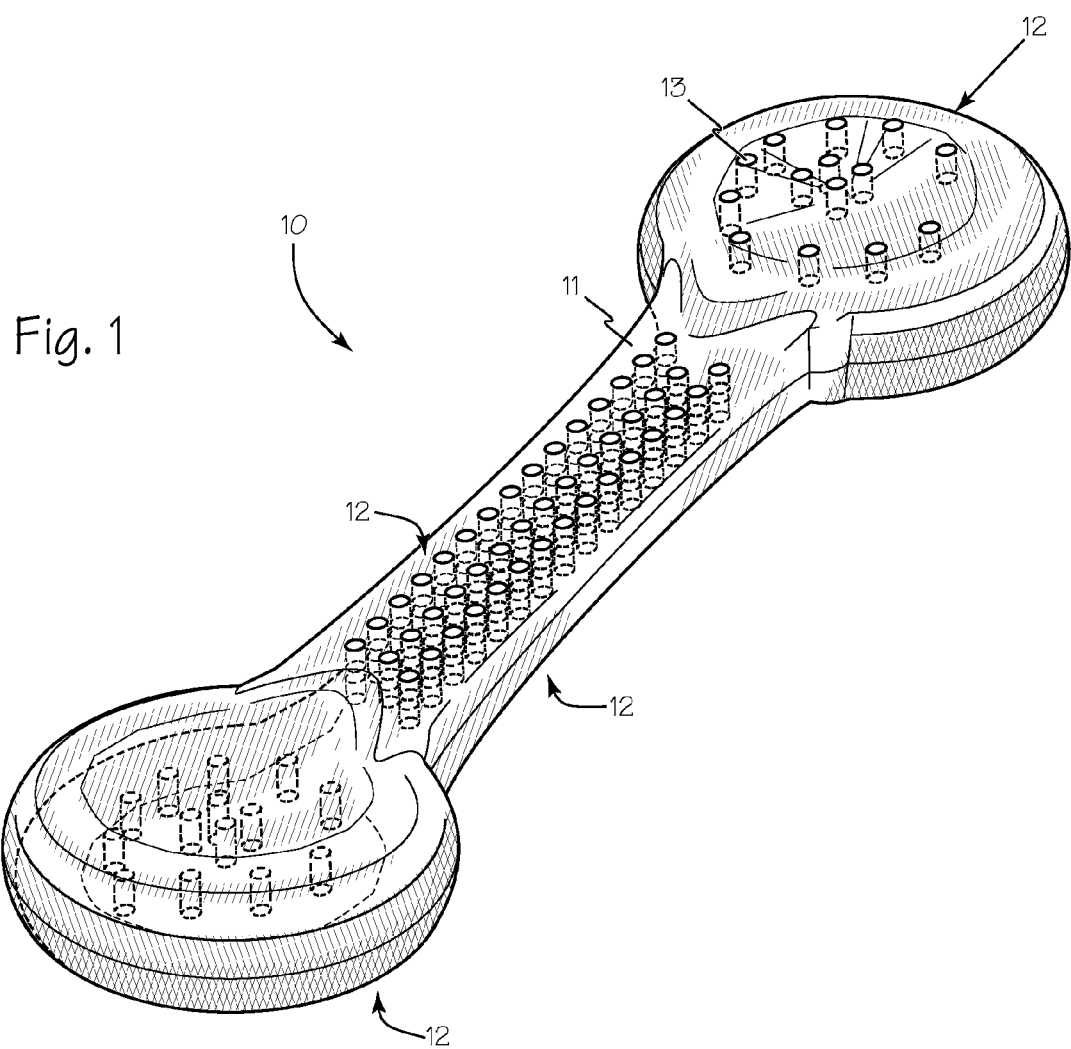

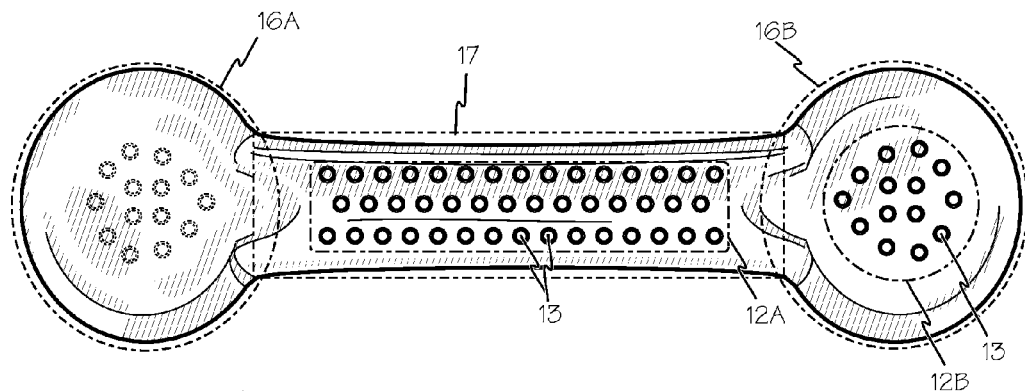
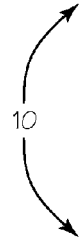
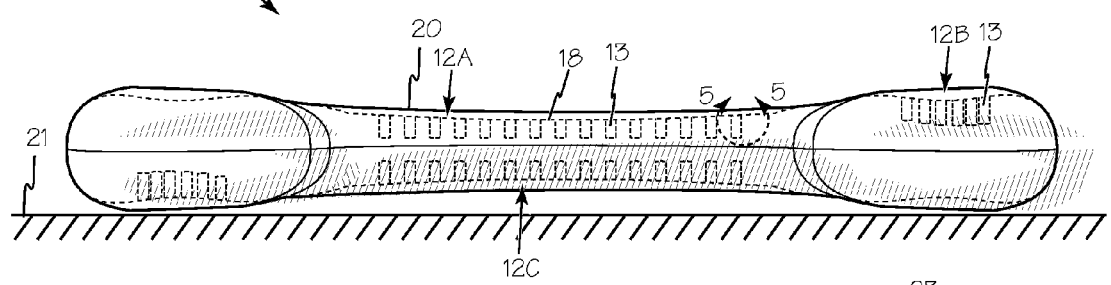
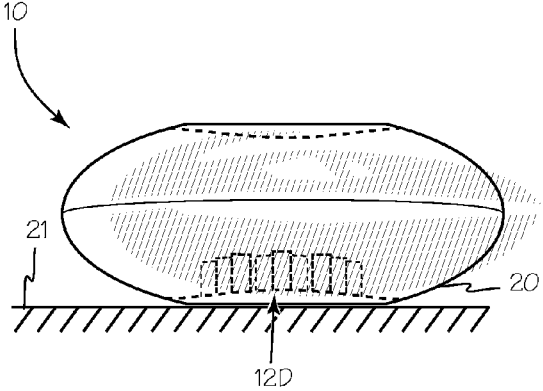
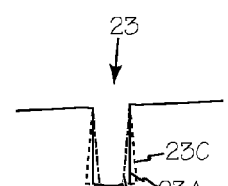

CHEW TOY

RELATED APPLICATIONS

This application claims priority from U.S. Provisional Patent Application 61/951,296 filed Mar. 11, 2014.

FIELD OF THE INVENTIONS

The inventions described below relates to the field of chewable pet toys and more specifically to chewable pet toys that permit addition of selected flavors and treats.

BACKGROUND OF THE INVENTIONS

Stimulating pets to maintain their health is often achieved by providing toys for the pet to chase, chew or otherwise interact with. Chewable toys that permit the pet owner to add and change flavors and tastes to the toy are popular.

SUMMARY

The devices and methods described below provide for a chewable pet toy includes recesses in one or more surface of the chewable toy to permit addition of flavors and treats to a chew toy. The recesses are shaped and oriented to keep the added flavors and treats from contacting floors, rugs and furniture on which the toy may be dropped by the pet.

The assortment of recesses in the surface of the chew toy are configured to capture and retain any suitable treat in paste or semi-solid form such as peanut butter, cheese or flavored pet treats. The recesses are configured to permit the chew toy to be cleaned to remove old treats and enable addition of new treats to the recesses.

A chewable pet toy as described below includes a generally bar shaped chew toy with concave upper and lower surfaces and a plurality of recesses in the concave upper and lower surfaces.

The chewable pet toy may be formed of any suitable material to withstand repeated chewing by a pet. Suitable materials may be any suitable polymer such as nylon polymer or any suitable rubber such as Poly(styrene-butadiene-styrene) (SBS) or any suitable plastic may be used. The chew toy may adapt any suitable shape such as the shape of a generally rectangular bar, or two disks connected by a generally rectangular bar with all three elements oriented in a single plane. Each of the two disks has a concave upper and lower surface and the generally rectangular bar has a concave upper and lower surface with the upper surfaces of the two disks and the upper surface of the rectangular bar oriented to be generally planar.

BRIEF DESCRIPTION OF THE DRAWINGS

FIG. 1 is a perspective view of a chew toy with recesses for pet treats.
FIG. 2 is a top view of the chew toy of FIG. 1.
FIG. 3 is a side view of the chew toy of FIG. 1.
FIG. 4 is an end view of the chew toy of FIG. 1.
FIG. 5 is a close-up cross section view the chew toy of FIG. 3 taken along 5-5.

DETAILED DESCRIPTION OF THE INVENTIONS

Chewable pet toy 10 is illustrated in FIG. 1. Body 11 may adopt any suitable shape and is formed from any suitably safe, chew resistant material such as nylon polymer, plastic or rubber. Body 11 includes one or more flavor areas 12, each flavor area including one or more recesses such as recess 13. Recesses such as recess 13 may be filled with any suitable pet treat. For example, any malleable, semi-soft or paste treat such a peanut butter, cheese or any other pet treat may be pushed into the recesses to provide stimulating flavor and odor for a pet.

Chew toy 10 may have a generally rectangular bar shape or as illustrated in FIG. 2 chew toy 10 may be configured as a combination of suitably shaped body elements such as disks 16A and 16B, joined together by a generally rectangular bar 17. A chew toy includes at least one flavor area such as area 12A. Alternatively, each body element may include one or more flavor areas such as areas 12A and 12B. Each flavor area includes one or more recesses such as recesses 13 which extend from the surface of the body into the body of the chew toy.

Any chew toy surface containing a flavor area is shaped to be concave into the chew toy body. Referring now to FIGS. 3 and 4, surface 18 is slightly concave to keep flavor area 12A recessed below perimeter edge 20. This configuration keeps all the flavor areas such as flavor areas 12C and 12D from contacting any planar surface on which the chew toy rests such as surface 21 which may be a floor or furniture or other surface.

Referring now to FIG. 5, recesses such as recess 23 may adopt any suitable profile. For example, recess 23 may be cylindrical such as profile 23A, conical such as profile 23B, or inverted conical such as profile 23C. Compound shapes may also be used.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A chewable pet toy comprising:
   a generally bone shaped polymer including
   an elongated member, the elongated member having a perimeter edge and a pair of opposite sides, each side of the elongated member having a continuously curved concave surface;
   a plurality of adjacent recesses formed in the concave surface of each side of the elongated member, wherein the recesses are arranged in a line parallel to the perimeter edges of the elongated member, and wherein each recess is separated from an adjacent recess by a portion of the concave surface and is adapted to be filled with a pet treat;
   a first enlarged, generally circular end member connected to a first end of the elongated member, the first end member having a first side facing a first direction and a second side facing a second direction, at least one of the sides including a continuously curved concave surface;
   a plurality of recesses formed in the concave surface of the first end member, wherein each recess is separated from an adjacent recess by a portion of the concave surface and is adapted to be filled with the pet treat;

a second enlarged, generally circular end member connected to a second end of the elongated member, the second end member having a first side facing the first direction and a second side facing the second direction, at least one of the sides including a continuously curved concave surface; and a plurality of recesses formed in the concave surface of the second end member, wherein each recess is separated from an adjacent recess by a portion of the concave surface is adapted to be filled with the pet treat.

2. The chewable pet toy of claim 1 wherein the plurality of recesses in the first end member are formed in the first side, and the plurality of recesses in the second end member are formed in the second side.

3. The chewable pet toy of claim 1 wherein the chew toy is formed of nylon polymer.

4. The chewable pet toy of claim 1 wherein the chew toy is formed of plastic.

5. The chewable pet toy of claim 1 wherein the chew toy is formed of rubber.

6. A chewable pet toy comprising:

a generally bone shaped polymer including an elongated member, the elongated member having a perimeter edge and a pair of opposite sides;

a plurality of identically sized and shaped recesses formed in each side of the elongated member, wherein each recess is adapted to be filled with a pet treat;

a first enlarged, generally circular end member connected to a first end of the elongated member, the first end member having a first side facing a first direction and a second side facing a second direction;

a plurality of recesses formed in the first end member, wherein each recess is adapted to be filled with the pet treat;

a second enlarged, generally circular end member connected to a second end of the elongated member, the second end member having a first side facing the first direction and a second side facing the second direction;

a plurality of recesses formed in the second end member, wherein each recess is adapted to be filled with the pet treat; and wherein each side of the elongated member includes a continuously curved concave surface, the plurality of adjacent recesses being formed in the concave surface of each side of the elongated member, and wherein each recess is separated from an adjacent recess by a portion of the concave surface.

7. The chewable pet toy of claim 6 wherein at least one side of the first end member and at least one side of the second end member includes a continuously curved concave surface and further comprising:

a plurality of recesses formed in the concave surface of the first end member, wherein each recess is separated from an adjacent recess by a portion of the concave surface and is adapted to be filled with the pet treat; and a plurality of recesses formed in the concave surface of the second end member, wherein each recess is separated from an adjacent recess by a portion of the concave surface is adapted to be filled with the pet treat.

8. The chewable pet toy of claim 7 wherein the plurality of recesses in the first end member are formed in the first side, and the plurality of recesses in the second end member are formed in the second side.

9. The chewable pet toy of claim 6 wherein the plurality of identically sized and shaped recesses are arranged adjacently to one another in a line parallel to the perimeter edges of the elongated member.

10. The chewable pet toy of claim 6 wherein the chew toy is formed of nylon polymer.

11. The chewable pet toy of claim 6 wherein the chew toy is formed of plastic.

12. The chewable pet toy of claim 6 wherein the chew toy is formed of rubber.

* * * * *